US008352531B2

(12) United States Patent
Boersma et al.

(10) Patent No.: US 8,352,531 B2
(45) Date of Patent: Jan. 8, 2013

(54) EFFICIENT FORCING OF CORNER CASES IN A FLOATING POINT ROUNDER

(75) Inventors: Maarten J. Boersma, Holzgerlingen (DE); J. Adam Butts, Hartsdale, NY (US); Silvia Melitta Mueller, Altdorf (DE); Jochen Preiss, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1204 days.

(21) Appl. No.: 12/177,346

(22) Filed: Jul. 22, 2008

(65) Prior Publication Data

US 2010/0023573 A1    Jan. 28, 2010

(51) Int. Cl.
*G06F 7/38* (2006.01)
(52) U.S. Cl. .................. 708/497; 708/498; 708/550
(58) Field of Classification Search .......... 708/204–205, 708/496–499, 542–553
See application file for complete search history.

(56) References Cited

U.S. PATENT DOCUMENTS

| | | | | |
|---|---|---|---|---|
| 4,977,535 A * | 12/1990 | Birger | ........................... | 708/497 |
| 5,162,666 A * | 11/1992 | Tran | ................. | 327/408 |
| 5,235,533 A * | 8/1993 | Sweedler | ....................... | 708/204 |
| 5,251,166 A * | 10/1993 | Ishida | ........................... | 708/493 |
| 5,258,943 A * | 11/1993 | Gamez et al. | ................... | 708/497 |
| 5,373,461 A * | 12/1994 | Bearden et al. | ................ | 708/505 |
| 5,511,016 A * | 4/1996 | Bechade | ........................ | 708/497 |
| 5,696,711 A * | 12/1997 | Makineni | ...................... | 708/497 |
| 5,748,516 A * | 5/1998 | Goddard et al. | ............. | 708/497 |
| 5,764,555 A * | 6/1998 | McPherson et al. | .......... | 708/497 |
| 5,781,464 A * | 7/1998 | Mehta | ........................... | 708/495 |
| 6,151,612 A * | 11/2000 | Song | ........................... | 708/204 |
| 6,314,442 B1 * | 11/2001 | Suzuki | ........................... | 708/497 |
| 6,405,231 B1 * | 6/2002 | Nowka | .......................... | 708/497 |
| 6,510,446 B1 * | 1/2003 | Fukagawa | ...................... | 708/497 |
| 6,898,614 B2 * | 5/2005 | Birru et al. | ...................... | 708/551 |
| 6,996,596 B1 | 2/2006 | Ho et al. | | |
| 7,113,969 B1 | 9/2006 | Green et al. | | |
| 7,177,893 B2 * | 2/2007 | Dupont de Dinechin | ..... | 708/552 |
| 7,225,323 B2 * | 5/2007 | Siu et al. | ....................... | 712/222 |
| 7,689,640 B2 * | 3/2010 | Renno et al. | ................... | 708/552 |
| 7,774,393 B1 * | 8/2010 | Brooks et al. | ................. | 708/204 |
| 8,015,231 B2 * | 9/2011 | Lutz et al. | ...................... | 708/620 |
| 2007/0282938 A1 * | 12/2007 | Abdallah et al. | .............. | 708/550 |
| 2010/0306292 A1 * | 12/2010 | Catherwood et al. | ......... | 708/209 |

OTHER PUBLICATIONS

S. Jain, "Low-power single-precision IEEE floating-point unit," MIT (Master's Thesis), May 2003.*

(Continued)

*Primary Examiner* — Chuong D Ngo
*Assistant Examiner* — Matthew Sandifer
(74) *Attorney, Agent, or Firm* — Cantor Colburn LLP; Randall Bluestone

(57) ABSTRACT

The forcing of the result or output of a rounder portion of a floating point processor occurs only in a fraction non-increment data path within the rounder and not in the fraction increment data path within the rounder. The fraction forcing is active on a corner case such as a disabled overflow exception. A disabled overflow exception may be detected by inspecting the normalized exponent. If a disabled overflow exception is detected, the round mode is selected to execute only in the non-increment data path thereby preventing the fraction increment data path from being selected.

13 Claims, 1 Drawing Sheet

OTHER PUBLICATIONS

IEEE Standard for Binary Floating-Point Arithmetic, The Institute of Electrical and Electronics Engineers, Inc. (Copyright 1985), Approved Mar. 21, 1985, IEEE Std 754-1985; Approved Jul. 26, 1985 by the American National Standards Institute.

DRAFT Standard for Floating-Point Arithmetic P754, Oct. 5, 2007, Copyright 2007 by the IEEE.

P6 Binary Floating-Point Unit, Son Dao Trong et al.

Binary Floating-Point Unit Design: The Fused Multiply-Add Dataflow, Schwarz, Eric M., IBM Corp., MS:P310, 2455 South Road Poughkeepsie, NY, 12601. (Submitted by Author for publication in High-Performance Energy-efficient Microprocessor Design, http:www.ecampus.com/book/0387285946, Sep. 20, 2007, 17:49, as Chapter 8).

* cited by examiner

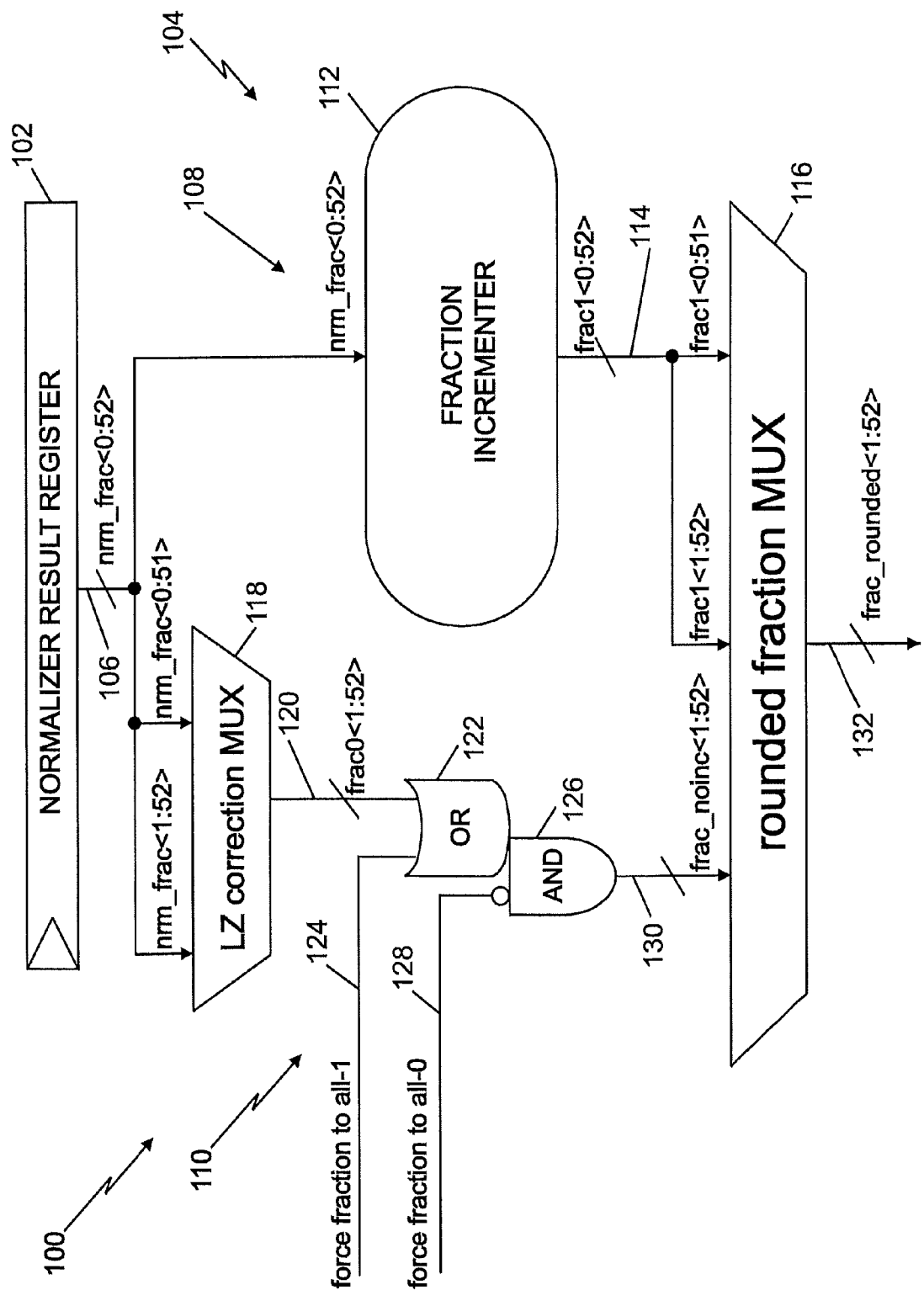

EFFICIENT FORCING OF CORNER CASES IN A FLOATING POINT ROUNDER

GOVERNMENT RIGHTS

This invention was made with Government support under Contract No.: HR0011-07-9-0002 awarded by DARPA. The Government has certain rights in this invention.

BACKGROUND

The present invention relates generally to floating point processors, and, more particularly, to the forcing of corner cases in a rounder portion of a floating point processor.

A binary floating point processor ("BFP") includes a rounder that receives its input from the normalizer component of the BFP. As the normalizer shift amount is computed by a leading zero anticipator, the normalizer result is either correctly normalized or it may need a shift correction by one bit. When a corner case occurs such as, for example, a disabled overflow exception, the fraction or significand result of the rounder is forced or rounded to either infinity or the largest representable number ("Xmax") with the appropriate plus or minus sign. Whether infinity or Xmax needs to be forced depends on the sign of the fraction result and the current rounding mode. To force the fraction to infinity, the fraction may be forced to all zeros. To force the fraction to Xmax, the fraction may be forced to all ones.

BRIEF SUMMARY

According to an embodiment of the invention, the forcing of the result or output of a rounder portion of a floating point processor occurs only in a fraction non-increment data path within the rounder and not in the fraction increment data path within the rounder. The fraction forcing is active on a corner case such as a disabled overflow exception. A disabled overflow exception may be detected by inspecting the normalized exponent. If a disabled overflow exception is detected, the round mode is selected to execute only in the non-increment data path thereby preventing the fraction increment data path from being selected.

BRIEF DESCRIPTION OF THE SEVERAL VIEWS OF THE DRAWINGS

Referring to the exemplary drawings wherein like elements are numbered alike in the several Figures:

FIG. 1 is a block diagram of a rounder portion of a floating point processor that forces corner cases in accordance with an embodiment of the invention.

DETAILED DESCRIPTION

Referring to FIG. 1, the sole FIGURE, there illustrated in block diagram form is circuitry 100 that comprises a portion of a binary floating point processor ("BFP") in which an embodiment of the invention is implemented. The design of the BFP may be implemented as a fused multiply-add dataflow. Those portions of a fused multiply-add dataflow BFP that are not a part of an embodiment of the invention are not disclosed herein. Shown in FIG. 1 is a normalizer result register 102, which is part of the normalizer portion of the BFP. At this stage in the BFP dataflow, a truncated intermediate result has been computed by the BFP in a known manner. This intermediate result is stored in the normalizer result register 102. The intermediate result requires rounding, which is carried out by the embodiment of the rounder 104 of the invention shown in FIG. 1. The rounding function will select between the two machine representable numbers that are closest to the actual value. Thus, in FIG. 1, an embodiment of the rounder 104 of the invention includes all of the components thereof illustrated therein except for addition of the normalizer result register 102 shown in FIG. 1.

The output of the normalizer result register 102 on a line or bus 106 represents the 52 bits of a fraction portion of a 64-bit double precision word ("doubleword"), in the embodiment of the invention. The normalizer result register 102 is 53 bits wide. However, the actual 52 fraction bits are located either in the first 52 bits (i.e., bits 0-51) of the normalizer result register 102 or in the second 52 bits (i.e., bits 1-52) of the normalizer result register 102. The actual location of the fraction bits in the register 102 depends on the correctness of the leading zero anticipation. Other word sizes may be utilized besides 64 bits. This output 106 is then split into two separate data paths: a first incrementing data path 108 and a second, non-incrementing data path 110. The output 106 of the normalizer result register 102 connects to a fraction incrementer 112 located in the incrementing data path 108.

As mentioned above, the rounding function will select between the two machine representable numbers (e.g., X1, X2) that are closest to the actual value, where in an embodiment X1 is the number closer to zero. X1 is found by copying the first 52 fraction bits from the normalizer result register 102. The purpose of the fraction incrementer 112 is to generate the 52 fraction bits of the alternative machine representable number X2. The fraction bits of X2 are found by adding '1' to the Least Significant Bit (LSB) position of X1. The value X1 corresponds to frac0<1:52> in FIG. 1, selected in the truncation or non-incrementing data path 110. For the case where X1 is the correctly rounded result, the shift-by-one correction is done in the LZ correction multiplexer 118: if the leading zero anticipation is correct, the 52 fraction bits of X1 are in nrm_frac<1:52>; if the leading zero anticipation is off by one bit, the 52 fraction bits of X1 are in nrm_frac<0:51>. If X2 is the correct result, its 52 fraction bits are in frac1<1:52> if the leading zero anticipation is correct, or in frac1<0:51> if the leading zero anticipation is off by one bit. Both values are computed in the increment data path 108. The fraction incrementer 112 will either add '1' on bit nrm_frac<52> if the leading zero anticipation is correct, or add '1' on bit nrm_frac<51> if the leading zero anticipation is off by one bit. Thus, if a corner case is not detected, a correct fraction is computed by the incrementing data path 108. The output of the fraction incrementer 112 on a line or bus 114 is provided to a rounded fraction multiplexer 116. Two sets of bits may be provided to the multiplexer 116: a first set that comprises bits 1-52 and a second set that comprises bits 0-51.

The non-incrementing data path 110 includes a leading zero correction multiplexer 118 that selects between bits 1-52 or bits 0-51 of the output 106 of the normalizer result register 102. The output of the multiplexer 118 on a line or bus 120 connects to one input of an "OR" logic gate 122. The other input of the OR gate 122 connects to a signal on a line 124 to force the fraction to all-ones. The output of the OR gate connects with an input of a "AND" logic gate 126. The other (inverting) input of the AND gate 126 connects to a signal on a line 128 to force the fraction to all-zeros. The output of the AND gate 126 is a signal on a line 130 that connects to the rounded fraction multiplexer 116. The rounded fraction multiplexer 116 selects one of the three inputs and provides a rounded fraction on a line 132 at its output.

According to an embodiment of the invention, the forcing of the result or output fraction of the rounder portion 104 of a floating point processor to a "special" value (e.g., all zeros or all ones) upon detection of a corner case occurs only in the non-increment data path 110 within the rounder 104 and not also in the increment data path 108. The non-increment data path 110 may also be referred to as the "truncation" path, as this is the path where no fraction increment occurs. The fraction forcing is active on a corner case such as a disabled overflow exception. A disabled overflow exception is a type of exception in floating point processors that may occur during execution of computational instructions by the BFP. The BFP typically includes a floating point status and control register (FPSCR) that contains bits each of which indicates the status of a portion of the BFP or the occurrence of an event within the BFP. The FPSCR includes a bit that indicates the setting of an overflow exception enable bit. A disabled overflow exception may be detected by inspecting the normalized exponent (expn). That is, an overflow exception may occur within the BFP when the magnitude of what would have been the rounded result if the exponent range were unbounded exceeds that of the largest finite number of the specified result precision.

If a disabled overflow exception occurs, the result is forced to either infinity or the largest representable number ("Xmax") with the appropriate plus or minus sign. Whether infinity or Xmax needs to be forced, and thus the corresponding forced fraction, depends on the sign of the result and on the current rounding mode. See Table 1.

TABLE 1

Fraction to be forced on disabled overflow exception.

| Round mode | Sign of result | Value to be forced | Rounded fraction |
| --- | --- | --- | --- |
| Round to nearest even | positive | +Infinity | all zeros |
| Round to nearest even | negative | −Infinity | all zeros |
| Round toward +Infinity | positive | +Infinity | all zeros |
| Round toward −Infinity | negative | −Infinity | all zeros |
| Round toward −Infinity | positive | +Xmax | all ones |
| Round toward +Infinity | negative | −Xmax | all ones |
| Round toward zero | positive | +Xmax | all ones |
| Round toward zero | negative | −Xmax | all ones |

The fraction forcing is active on a disabled overflow exception before rounding. As mentioned, disabled overflow before rounding is detected by inspecting the normalized exponent and can be computed early. If a disabled overflow exception before rounding is detected, the round mode is forced to round to zero to prevent the fraction increment data path 108 from being selected. There is one case where a disabled overflow exception after rounding occurs, but no disabled overflow exception before rounding was detected. In this case, the magnitude of the truncated result is equal to Xmax, hence the fraction before rounding has all ones. The regular rounding decision logic will only decide to round up if the desired result is infinity, which has an all-zero fraction. The result of incrementing an aft-one fraction by one will lead to an all-zero fraction, so this case is already handled correctly by the fraction rounder according to an embodiment of the invention.

An additional aspect of the embodiment of the invention occurs because of the recognition that different overflow conditions exist for "lz exact", indicating that the leading zero anticipation is correct, and "lz 1 bit too large", indicating that the leading zero anticipation was off by one. For "lz exact", an overflow exception occurs if the normalized exponent, expn, is greater than the maximum normal number exponent, EMAX (i.e., "expn>EMAX"), which for a 64-bit double word is equal to a value of 1023. For "lz 1 bit too large", an overflow exception occurs if expn is greater than or equal to EMAX. As a result, two rounding modes are provided: round mode (lz exact) and round mode (lz 1 bit too large). The resulting rounding for each of these conditions is given in Table 2.

TABLE 2

Fraction forcing for disabled overflow exception

| | "lz exact" | "lz 1 bit too large" |
| --- | --- | --- |
| expn > EMAX | force fraction, truncation rounding | force fraction, truncation rounding |
| expn = EMAX | do not force, regular rounding | force fraction, truncation rounding |
| expn < EMAX | do not force, regular rounding | do not force, regular rounding |

The invention has been described and illustrated with respect to a floating point rounder. However, the invention may be applicable to components other than rounders. For example, in a circuit where different data paths with different delays are multiplexed together inherently has the problem where the most critical path has to go through a multiplexer with several input ports. The solution is that all less critical data paths are combined early and share their multiplexer data port. The critical data paths receive dedicated data ports. The advantage with this solution is that the critical path now goes through a multiplexer with less input ports, which results in a faster design.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A floating point processor, comprising:
a normalizer result bus that contains an intermediate calculated result; and
a rounder that has an increment data path and a non-increment data path, wherein the intermediate calculated result is provided to an input of each of the increment data path and the non-increment data path, wherein upon an occurrence of a corner case, the non-increment data path forces a fraction portion of the intermediate calculated result to all ones or all zeros and the increment data path does not force a fraction portion of the intermediate calculated result to all ones or all zeros;
the non-increment data path comprises a leading zero correction multiplexer that selects between bits 1-52 or bits 0-51 of the intermediate calculated result of the normalizer result bus, output of the leading zero correction multiplexer connecting to a first input of a logic OR gate while a second input of the logic OR gate connects to a signal to force the fraction portion to all ones, where output of the logic OR gate connects to a non-inverting logic of a logic AND gate while an inverting input of the logic AND gate connects to a signal to force the fraction portion to all zeros, and wherein output of the logic AND gate if a first rounder input to a rounded fraction multiplexer;
the increment data path comprises a fraction incrementer that adds 1 to a least significant bit position, the fraction incrementer outputting a second rounder input of a first set of bits 1-52 to the rounded fraction multiplexer and outputting a third rounder input of a second set of bits 0-51 to the rounded fraction multiplexer.

2. The floating point processor of claim 1, wherein the rounder comprises the rounded fraction multiplexer that selects between an output from the increment data path and an output of a non-increment data path to provide to an output of the rounded fraction multiplexer.

3. The floating point processor of claim 1, wherein the increment data path and the non-increment data path are arranged in parallel.

4. The floating point processor of claim 3, wherein upon the detection of a corner case, the non-increment data path forces the fraction portion of the intermediate calculated result to all ones or all zeros, depending on a current rounding mode, and if a corner case is not detected, a fraction is computed by the increment data path.

5. The floating point processor of claim 4, wherein the corner case comprises a disabled overflow exception.

6. A rounder, comprising:
an increment data path; and
a non-increment data path;
wherein an intermediate calculated result from a normalizer result bus is provided to an input of each of the increment data path and the non-increment data path, wherein upon an occurrence of a corner case, the non-increment data path forces a fraction portion of the intermediate calculated result to all ones or all zeros and the increment data path does not force a fraction portion of the intermediate calculated result to all ones or all zeros;
the non-increment data path comprises a leading zero correction multiplexer that selects between bits 1-52 or bits 0-51 of the intermediate calculated result of the normalizer result bus, output of the leading zero correction multiplexer connecting to a first input of a logic OR gate while a second input of the logic OR gate connects to a signal to force the fraction portion to all ones, wherein output of the logic OR gate connects to a non-inverting input of a logic AND gate while an inverting input of the logic AND gate connects to a signal to force the fraction portion to all zeros, and wherein the output of the logic AND gate is a first rounder input to a rounded fraction multiplexer;
the increment data path comprises a fraction incrementer that adds 1 to a least significant bit position, the fraction incrementer outputting a second rounder input of a first set of bits 1-52 to the rounded fraction multiplexer and outputting a third rounder input of a second set of bits 0-51 to the rounded fraction multiplexer.

7. The rounder of claim 6, wherein the increment data path and the non-increment data path are arranged in parallel.

8. The rounder of claim 7, wherein upon the detection of a corner case, the non-increment data path forces the fraction portion of the intermediate calculated result to all ones or all zeros, depending on a current rounding mode, and if a corner case is not detected, fraction is computed by the increment data path.

9. The rounder of claim 8, wherein the corner case comprises a disabled overflow exception.

10. A method, comprising:
incrementing an intermediate calculated result from a normalizer result bus in an increment data path; and
upon an occurrence of a corner case, forcing a fraction portion of the intermediate calculated result to all ones or all zeros in a non-increment data path, wherein the increment data path does not force a fraction portion of the intermediate calculated result to all ones or all zeros upon the occurrence of a corner case;
the non-increment data path comprises a leading zero correction multiplexer that selects between bits 1-52 or bits 0-51 of the intermediate calculated result of the normalizer result bus, output of the leading zero correction multiplexer connecting to a first input of a logic OR gate while a second input of the logic OR gate connects to a signal to force the fraction portion to all ones, wherein output of the logic OR gate connects to a non-inverting input of a logic AND gate while an inverting input of the logic AND gate connects to a signal to force the fraction portion to all zeros, and wherein the output of the logic AND gate is a first rounder input to a rounded fraction multiplexer;
the increment data path comprises a fraction incrementer that adds 1 to a least significant bit position, the fraction incrementer outputting a second rounder input of a first set of bits 1-52 to the rounded fraction multiplexer and outputting a third rounder input of a second set of bits 0-51 to the rounded fraction multiplexer.

11. The method of claim 10, wherein the increment data path and the non-increment data path are arranged in parallel.

12. The method of claim 11, wherein upon the detection of a corner case, forcing a fraction portion of the intermediate calculated result to all ones or all zeros, depending on a current rounding mode, and if a corner case is not detected, a fraction is computed by the increment data path.

13. The method of claim 12, wherein the corner case comprises a disabled overflow exception.

* * * * *